US 8,010,563 B2
Aug. 30, 2011

(12) United States Patent
Simons

(10) Patent No.: US 8,010,563 B2
(45) Date of Patent: Aug. 30, 2011

(54) COMPUTER PROGRAM PRODUCT AND COMPUTING SYSTEM FOR INFORMATION ORGANIZATION USING MARKUP LANGUAGES

(75) Inventor: Walt G Simons, Cherrybrook (AU)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 12/041,040

(22) Filed: Mar. 3, 2008

(65) Prior Publication Data

US 2008/0215608 A1    Sep. 4, 2008

Related U.S. Application Data

(63) Continuation of application No. 09/907,113, filed on Jul. 17, 2001, now Pat. No. 7,349,916.

(51) Int. Cl.
*G06F 7/00* (2006.01)

(52) U.S. Cl. ........................................ 707/790
(58) Field of Classification Search .................. 707/790
See application file for complete search history.

(56) References Cited

U.S. PATENT DOCUMENTS

| | | | |
|---|---|---|---|
| 5,890,171 A | 3/1999 | Blumer | |
| 5,956,709 A | 9/1999 | Xue | |
| 5,999,941 A | 12/1999 | Andersen | |
| 6,035,119 A | 3/2000 | Massena | |
| 6,061,698 A | 5/2000 | Chadha | |
| 6,081,837 A | 6/2000 | Stedman | |
| 6,243,700 B1 * | 6/2001 | Zellweger | 707/3 |
| 6,272,493 B1 | 8/2001 | Pasquali | |
| 6,301,583 B1 | 10/2001 | Zellweger | |
| 6,470,349 B1 | 10/2002 | Heninger | |
| 6,578,078 B1 | 6/2003 | Smith | |
| 6,625,803 B1 | 9/2003 | Massena | |
| 6,771,291 B1 | 8/2004 | DiStefano, III | |
| 6,996,780 B2 | 2/2006 | Estrada | |
| 7,006,098 B2 | 2/2006 | Bickmore | |
| 7,028,262 B2 | 4/2006 | Estrada | |
| 7,032,183 B2 * | 4/2006 | Durham | 715/823 |
| 2002/0169851 A1 | 11/2002 | Weathersby | |
| 2003/0037069 A1 | 2/2003 | Davison | |
| 2004/0039993 A1 * | 2/2004 | Kougiouris et al. | 715/513 |
| 2004/0220791 A1 * | 11/2004 | Lamkin et al. | 703/11 |
| 2006/0136309 A1 * | 6/2006 | Horn et al. | 705/26 |

OTHER PUBLICATIONS

O'Reilly, JavaScript the definitive Guide, Jan. 2002, 4$^{th}$ edition, p. 127-128, section 8.5.6; p. 189, section 12.2.2 and p. 222.*
Holzchlag, Molly E., Special Edition Using HTML 4, Sixth Edition, Que Corporation, Dec. 23, 1999, Chapter 19.
Reynolds, Mark C. et al., Using Javascript, Que Corporation, 1996, pp. 1-3.
Flanagan, David, JavaScript, 1998. O'Reilly, 4th Edition, pp. 127-129, 189, and 222.

* cited by examiner

*Primary Examiner* — Charles Rones
*Assistant Examiner* — Fazlul Quader
(74) *Attorney, Agent, or Firm* — Anthony V. S. England; William Steinberg

(57) ABSTRACT

The presentation of information in HTML files is desirably enhanced by the use of one or more separate scripting Javascript™ files, referenced from the HTML file, which uses information presented as variables in the HTML file. In this manner, a high degree of formatting flexibility can be achieved, while reducing the likelihood of errors in the HTML pages, improving ease of site maintenance, and standardizing the "look and feel" of the site. Improvements in the network bandwidth required to browse sites organized in this manner can also be achieved in favorable instances.

24 Claims, 15 Drawing Sheets

NAVJS.HTML (EXAMPLE 1)

```
<HTML>
<HEAD><TITLE>IDP Test 1</TITLE>
<STYLE> type = "text/ccs">
span {font-size:9pt; font-family: verdana,helvetica,arial,sans-
serif;}
.nav {color:#666666; font-weight: bold;}
.nav a:link, .nav a:active, .nav a:visited, a:hover {color:#ffffff;
font-weight:normal; text-decoration:none;}
.nav a:hover {text-decoration:underline;}
.nav a:active {color:#cccccc;}
.nav b {font-weight:bold}
.nav {font-size: 7.5pt}
</STYLE>
<SCRIPT language = "JavaScript1.2" src = "idpnav.js">
</SCRIPT>
</HEAD>

<BODY>

<SCRIPT language = "JavaScript1.2" type = "text/javascript">
_B(1);
_L(1, "Individual Development Plan", "navjs1.html");
_L(1, "My IDPs", "navjs2.html", "navjs2.html");
_S(1);
_H(1, "My Team's IDPs");
_L(2, "IDPs By Status", "navjs4.html");
_L(2, "IDPs By Name", "navjs5.html");
_L(1, "For My Action", "navjs6.html");
_E();
</SCRIPT>

</BODY>
</HTML>
```

FIG. 4

IDPNAV.JS (EXAMPLE 1)

```
_iO="<IMG src=\"odot.gif\" border=\"0\"";
_im=_iO+" height=\"1\" width=\"1\" />";
_sp="<SPAN class=\"nav\">";
_td="<TD height=\"21\"";
_wl=0;

function _w(t){
document.writeln(t);
} function _t(w,h){
return "<TD width=\""+w+"\" height=\""+h+"\">"+_iO+" /></TD>";
} function _B(h){
_w("<TABLE border=\"0\" width=\"148\" cellpadding=\"0\""
 +" cellspacing=\"0\" bgcolor=\"#6666ff\">"
 +"<TR bgcolor=\"ffffff\">"
 +_t(10,h)+_t(15,h)+_t(15,h)+_t(98,h)+_t(10,h)
 +"</TR>");_bl();
} function _E(){
_bl();
_w("</TABLE>");
} function _1(i){
if(i==1)
 return ">";
return " colspan=\""+i+"\">";
} function _2(i){
return _1(4-i);
} function _bl(){
_w("<TR><TD colspan=\"5\">"+_im+"</TD></TR>");
}
```

FIG. 5A

```
function _wh(i){
c1=_1(i);
c2=_2(i);
_w("<TR><TD>"+c1+_im+"</TD><TD bgcolor=\"#ccccff\""
 +c2+_im+"</TD><TD>"+_im+"</TD></TR>");
} function _L(i,t,u){
if(_wl!=0)
 _wh(i);
_wl=i;
c1=_1(i);
c2=_2(i);
_w("<TR><TD>"+c1+" </TD>"+_td+c2+_sp+"<A href=\""+u+"\">"
 +t+"</A></SPAN></TD><TD> </TD></TR>");
} function _H(i,t){
_wl=0;
c1=_1(i);
c2=_2(i);
_w("<TR bgcolor=\"ffffff\"><TD>"+c1+" </TD>"+_td+c2
 +"<B><FONT size=\"-1\">"+_sp+t
 +"</SPAN></FONT></B></TD><TD> </TD></TR>");
} function _S(i){
if(_wl!=0)
 _wh(i);
_wl=0;
_w("<TR>"+_td+"
colspan=\"5\">"+_sp+" </SPAN></TD></TR>");
}
```

FIG. 5B

EQUIVALENT FILE (EXAMPLE 1)

```
<HTML>
<HEAD><TITLE>IDP Test 0</TITLE>
<STYLE type="text/css">
span {font-size:9pt; font-family: verdana,helvetica,arial,sans-
serif;}
.nav {color:#666666; font-weight: bold;}
.nav a:link, .nav a:active, .nav a:visited, a:hover {color:#ffffff;
font-weight:normal; text-decoration:none;}
.nav a:hover {text-decoration:underline;}
.nav a:active {color:#cccccc;}
.nav b {font-weight:bold}
.nav {font-size: 7.5pt}
</STYLE>
</HEAD>

<BODY>

<TABLE border="0" width="148" cellpadding="0" cellspacing="0"
bgcolor="#6666ff">

<TR bgcolor="ffffff">
  <TD width="10" height="1"><IMG src="odot.gif" border="0" /></TD>
  <TD width="15" height="1"><IMG src="odot.gif" border="0" /></TD>
  <TD width="15" height="1"><IMG src="odot.gif" border="0" /></TD>
  <TD width="98" height="1"><IMG src="odot.gif" border="0" /></TD>
  <TD width="10" height="1"><IMG src="odot.gif" border="0"
/></TD></TR>
<TR>
  <TD colspan="5"><IMG src="odot.gif" width="1" height="1" border="0"
/></TD></TR>
<TR>
  <TD> </TD>
  <TD colspan="3" height="21"><SPAN class="nav">
  <A href="navjs1.html">Individual Development Plan</A></SPAN></TD>
  <TD> </TD></TR>
<TR>
  <TD><IMG src="odot.gif" width="1" height="1" /></TD>
  <TD bgcolor="#ccccff" colspan="3">
  <IMG src="odot.gif" width="1" height="1" /></TD>
  <TD><IMG src="odot.gif" width="1" height="1" /></TD></TR>
<TR>
  <TD> </TD>
  <TD colspan="3" height="21"><SPAN class="nav">
  <A href="navjs2.html">My IDPs</A></SPAN></TD>
  <TD> </TD></TR>
<TR>
  <TD><IMG src="odot.gif" width="1" height="1" /></TD>
  <TD bgcolor="#ccccff" colspan="3">
  <IMG src="odot.gif" width="1" height="1" /></TD>
  <TD><IMG src="odot.gif" width="1" height="1" /></TD></TR>
<TR>
```

FIG. 6A

```
<TD> </TD>
 <TD colspan="3" height="21"><SPAN class="nav"> </SPAN></TD>
 <TD> </TD></TR>
<TR bgcolor="ffffff">
 <TD> </TD>
 <TD colspan="3" height="21"><B><FONT size="-1">
 <SPAN class="nav">My Team's IDPs</SPAN></FONT></B></TD>
 <TD> </TD></TR>
<TR>
 <TD colspan="2"> </TD>
 <TD colspan="2" height="21"><SPAN class="nav">
 <A href="navjs4.html">IDPs By Status</A></SPAN></TD>
 <TD> </TD></TR>
<TR>
 <TD colspan="2"><IMG src="odot.gif" width="1" height="1" /></TD>
 <TD bgcolor="#ccccff" colspan="2">
 <IMG src="odot.gif" width="1" height="1" /></TD>
 <TD><IMG src="odot.gif" width="1" height="1" /></TD></TR>
<TR>
 <TD colspan="2"> </TD>
 <TD colspan="2" height="21"><SPAN class="nav">
 <A href="navjs5.html">IDPs By Name</A></SPAN></TD>
 <TD> </TD></TR>
<TR>
 <TD><IMG src="odot.gif" width="1" height="1" /></TD>
 <TD bgcolor="#ccccff" colspan="3">
 <IMG src="odot.gif" width="1" height="1" /></TD>
 <TD><IMG src="odot.gif" width="1" height="1" /></TD></TR>
<TR>
 <TD> </TD>
 <TD colspan="3" height="21"><SPAN class="nav">
 <A href="navjs6.html">For My Action</A></SPAN></TD>
 <TD> </TD></TR>
<TR>
 <TD colspan="5"><IMG src="odot.gif" width="1" height="1"
/></TD></TR>

</TABLE>

</BODY>
</HTML>
```

FIG. 6B

NAVJS.HTML (EXAMPLE 2)

```
<HTML>
<HEAD><TITLE>Example 2</TITLE>
<STYLE type="text/css">
span {font-size:9pt; font-family: verdana,helvetica,arial,sans-
serif;}
.nav {color:#666666; font-weight: bold;}
.nav a:link, .nav a:active, .nav a:visited, a:hover {color:#ffffff;
font-weight:normal; text-decoration:none;}
.nav a:hover {text-decoration:underline;}
.nav a:active {color:#cccccc;}
.nav b {font-weight:bold}
.nav {font-size: 7.5pt}
</STYLE>
<SCRIPT language="JavaScript1.2" src="idpnav.js">
</SCRIPT>
<SCRIPT language="JavaScript1.2" type="text/javascript">
var w3i="";
var _mt=["Individual Development Plan",
         "My IDPs",
         "",
         "My Team's IDPs",
         "IDPs By Status",
         "IDPs By Name",
         "For My Action"];
var _mu=["navjs1.html",
         "navjs2.html",
         "-",
         "",
         "navjs4.html",
         "navjs5.html",
         "navjs6.html"];
var _mi=[1,1,0,1,2,2,1];
</SCRIPT>
</HEAD>
<BODY>
<SCRIPT language="JavaScript1.2" type="text/javascript">
getNavigator();
</SCRIPT>
</BODY>
</HTML>
```

FIG. 7

IDPNAV.JS (EXAMPLE 2)

```javascript
// Navigator generation routine (requires setp by IdpJspHelper for
w3i, _mt, _mu, _mi)
function getNavigator(){
 oib="<IMG src=\""+w3i+"odot.gif\" ";
 oie=" height=\"1\" border=\"0\"/>"
 oil=oib+"width=\"1\""+oie;
 document.writeln("<TABLE bgcolor=\"#6666ff\" width=\"148\"
cellpadding=\"0\" cellspacing=\"0\" border=\"0\">");
 document.writeln("<TR bgcolor=\"#ffffff\">");
 document.writeln("<TD>"+oib+"width=\"10\""+oie+"</TD>");
 document.writeln("<TD>"+oib+"width=\"15\""+oie+"</TD>");
 document.writeln("<TD>"+oib+"width=\"15\""+oie+"</TD>");
 document.writeln("<TD>"+oib+"width=\"98\""+oie+"</TD>");
 document.writeln("<TD>"+oib+"width=\"10\""+oie+"</TD></TR>");
 document.writeln("<TR><TD colspan=\"5\">"+oil+"</TD></TR>");
 mb="";
 for(i=0;i<_mt.length;i++){
  if(_mt[i]=="")
    document.writeln("<TR><TD colspan=\"5\"
height=\"21\"> </TD></TR>");
  else{
   cs1="";
   cs2="";
   switch(_mi[i]){
    case 2: cs1=" colspan=\"2\""; cs2=" colspan=\"2\""; break;
    case 3: cs1=" colspan=\"3\""; break;
    case 1: cs2=" colspan=\"3\""; break;
   }
   if(_mu[i]==""){
    document.writeln("<TR
bgcolor=\"#ffffff\"><TD"+cs1+"> </TD>");
    document.writeln("<TD colspan=\"3\" height=\"21\"><B><SPAN
class=\"nav\">"+_mt[i]+"</span></B></TD>");
    document.writeln("<TD> </TD>");
    document.writeln("</TR><TR bgcolor=\"#ffffff\">");
    document.writeln("<TD colspan=\"5\">"+oil+"</TD>");
    document.writeln("</TR>");
   }else{
    document.writeln("<TR><TD"+cs1+"> </TD>");
    document.writeln("<TD"+cs2+" height=\"21\"><SPAN class=\"nav\"><A
href=\""+_mu[i]+"\">"+_mt[i]+"</A></span></TD>");
    document.writeln("<TD> </TD>");
    document.writeln("</TR>");
    if (i==(_mt.length-1) || _mu[i+1]==""){
     document.writeln("<TR><TD colspan=\"5\">"+oil+"</TD>");
     document.writeln("</TR>");
    }else{
     document.writeln("<TR><TD"+cs1+">"+oil+"</TD>");
     document.writeln("<TD"+cs2+" bgcolor=\"#ccccff\">"+oil+"</TD>");
     document.writeln("<TD>"+oil+"</TD>");
     document.writeln("</TR>");
    }
   }
  }
 }
}
```

FIG. 8A

```
}
 document.writeln("<TR><TD colspan=\"5\">"+oil+"</TD>");
 document.writeln("</TR></TABLE>");
}
```

FIG. 8B

EQUIVALENT FILE (EXAMPLE 2)

```
<HTML>
<HEAD><TITLE>Example 2 (equivalent)</TITLE>
<STYLE type="text/css">
span {font-size:9pt; font-family: verdana,helvetica,arial,sans-
serif;}
.nav {color:#666666; font-weight: bold;}
.nav a:link, .nav a:active, .nav a:visited, a:hover {color:#ffffff;
font-weight:normal; text-decoration:none;}
.nav a:hover {text-decoration:underline;}
.nav a:active {color:#cccccc;}
.nav b {font-weight:bold}
.nav {font-size: 7.5pt}
</STYLE>
</HEAD>
<BODY>
<TABLE bgcolor="#6666ff" width="148" cellpadding="0" cellspacing="0"
border="0">
<TR bgcolor="#ffffff">
  <TD width="10" height="1"><IMG src="odot.gif" border="0" /></TD>
  <TD width="15" height="1"><IMG src="odot.gif" border="0" /></TD>
  <TD width="15" height="1"><IMG src="odot.gif" border="0" /></TD>
  <TD width="98" height="1"><IMG src="odot.gif" border="0" /></TD>
  <TD width="10" height="1"><IMG src="odot.gif" border="0"
/></TD></TR>
<TR>
  <TD colspan="5"><IMG src="odot.gif" width="1" height="1" border="0"
/></TD></TR>
<TR>
  <TD> </TD>
  <TD colspan="3" height="21"><SPAN class="nav">
  <A href="navjs1.html">Individual Development Plan</A></SPAN></TD>
  <TD> </TD></TR>
<TR>
  <TD><IMG src="odot.gif" width="1" height="1" border="0" /></TD>
  <TD bgcolor="#ccccff" colspan="3">
  <IMG src="odot.gif" width="1" height="1" border="0"/></TD>
  <TD><IMG src="odot.gif" width="1" height="1" border="0" /></TD></TR>
<TR>
  <TD> </TD>
  <TD colspan="3" height="21"><SPAN class="nav">
  <A href="navjs2.html">My IDPs</A></SPAN></TD>
  <TD> </TD></TR>
<TR>
  <TD><IMG src="odot.gif" width="1" height="1" border="0" /></TD>
  <TD bgcolor="#ccccff" colspan="3">
  <IMG src="odot.gif" width="1" height="1" border="0" /></TD>
  <TD><IMG src="odot.gif" width="1" height="1" border="0" /></TD></TR>
<TR>
  <TD> </TD>
  <TD colspan="3" height="21"><SPAN class="nav"> </SPAN></TD>
  <TD> </TD></TR>
<TR bgcolor="#ffffff">
  <TD> </TD>
  <TD colspan="3" height="21"><B><FONT size="-1">
```

FIG. 9A

```
<SPAN class="nav">My Team's IDPs</SPAN></FONT></B></TD>
  <TD> </TD></TR>
<TR bgcolor="#ffffff">
  <TD colspan="5"><IMG src="odot.gif" width="1" height="1" border="0"
/></TD></TR>
<TR>
  <TD colspan="2"> </TD>
  <TD colspan="2" height="21"><SPAN class="nav">
  <A href="navjs4.html">IDPs By Status</A></SPAN></TD>
  <TD> </TD></TR>
<TR>
  <TD colspan="2"><IMG src="odot.gif" width="1" height="1" border="0"
/></TD>
  <TD bgcolor="#ccccff" colspan="2">
  <IMG src="odot.gif" width="1" height="1" border="0" /></TD>
  <TD><IMG src="odot.gif" width="1" height="1" border="0" /></TD></TR>
<TR>
  <TD colspan="2"> </TD>
  <TD colspan="2" height="21"><SPAN class="nav">
  <A href="navjs5.html">IDPs By Name</A></SPAN></TD>
  <TD> </TD></TR>
<TR>
  <TD><IMG src="odot.gif" width="1" height="1" border="0" /></TD>
  <TD bgcolor="#ccccff" colspan="3">
  <IMG src="odot.gif" width="1" height="1" border="0"/></TD>
  <TD><IMG src="odot.gif" width="1" height="1" border="0" /></TD></TR>
<TR>
  <TD> </TD>
  <TD colspan="3" height="21"><SPAN class="nav">
  <A href="navjs6.html">For My Action</A></SPAN></TD>
  <TD> </TD></TR>
<TR>
  <TD colspan="5"><IMG src="odot.gif" width="1" height="1" border="0"
/></TD></TR>
</TABLE>
</BODY>
</HTML>
```

FIG. 9B

COMPUTER PROGRAM PRODUCT AND COMPUTING SYSTEM FOR INFORMATION ORGANIZATION USING MARKUP LANGUAGES

CROSS REFERENCE TO RELATED APPLICATION

This is a continuation of, and hereby claims the benefit of the priority date of, application Ser. No. 09/907,113 of Jul. 17, 2001 now U.S. Pat. No. 7,349,916.

FIELD OF THE INVENTION

The invention relates to organizing information and particularly, though not exclusively, to the formatting and presentation of information using the hypertext markup language (HTML) on World Wide Web (Web) sites accessed via the Internet global communications network.

BACKGROUND

Many Web sites hosted on the Internet typically comprise an often large number of separate HTML files that are interpretable by Web browsers operating on client terminals connected to the Internet. The HTML files are rendered by the browser so that the information within the HTML file is appropriately formatted for presentation by the browser.

There is often a considerable overhead associated with the non-data or formatting protocols used by these HTML files. For example, in some cases, especially involving tables, formatting tags can represent 3 times the data of the actual information content of the file.

Cascading style sheets (CSS) have been proposed as a method of more conveniently formatting Web sites across HTML documents. However, the use of style sheets is limited due to the inherent limitations of the defined standard, which dictates only a limited number of possible styles.

In view of the above, an improved method of organizing information in the context of, for example, markup languages, which at least attempts to address these and other limitations associated with existing techniques, is clearly desirable.

SUMMARY

Presentation of information in HTML files is desirably enhanced by the use of separate scripting files, referenced from the HTML file, which uses information presented as variables in the HTML file. In this manner, a high degree of formatting flexibility can be achieved, while reducing the likelihood of errors in the HTML pages, improving ease of site maintenance, and standardising the "look and feel" of the site improvements in the network bandwidth required to browse sites organised in this way can also be achieved in favourable instances.

A method of providing information files structured in a format having a predefined language and syntax involves providing a source file in a primary language and a supporting auxiliary file in a secondary language. The source file defines source variables interpretable by statements in the auxiliary file, and includes a reference to these statements in the auxiliary file. As a result, the source file is interpretable as statements wholly in the primary language, via the reference to the auxiliary file. Related techniques involve creating, organising or interpreting such information files. Information files so created can be stored and provided for access by third parties on a server or through an accessible storage medium.

The primary language is a formatting or descriptive language, or more particularly one of the existing markup languages such as HTML or, more generally, XML. The secondary language is a scripting, interpreted or functional language able to interpret variables from the source HTML file, and use those variables to generate HTML formatting statements. An example of a suitable language is the Javascript™ language. The source variables represent information particular to the HTML file, which the auxiliary file formats in a defined manner. The use of this arrangement is particularly advantageous if there are a large number of HTML pages containing corresponding data values that are appropriately formatted in a common way by a single auxiliary Javascript™ file.

DESCRIPTION OF DRAWINGS

FIG. 4 is a listing of the contents of a first example HTML file.

FIGS. 5A and 5B is a listing of the contents of a first example Javascript™ file.

FIGS. 6A and 6B is an equivalent listing of the contents of the first example HTML file of FIG. 4, after the reference to the Javascript™ file of FIGS. 5A and 5B has been taken into account to provide HTML formatting information to the data stored in the HTML file.

FIG. 7 is a listing of the contents of a second example HTML file.

FIGS. 8A and 8B is a listing of the contents of a second example Javascript™ file.

FIGS. 9A and 9B is an equivalent listing of the contents of the second example HTML file of FIG. 7, after the reference to the Javascript™ file of FIGS. 8A and 8B has been taken into account to provide HTML formatting information to the data stored in the HTML file.

DETAILED DESCRIPTION

A technique for providing HTML files that use the Javascript™ scripting language to provide formatting information is described.

Figure 1:
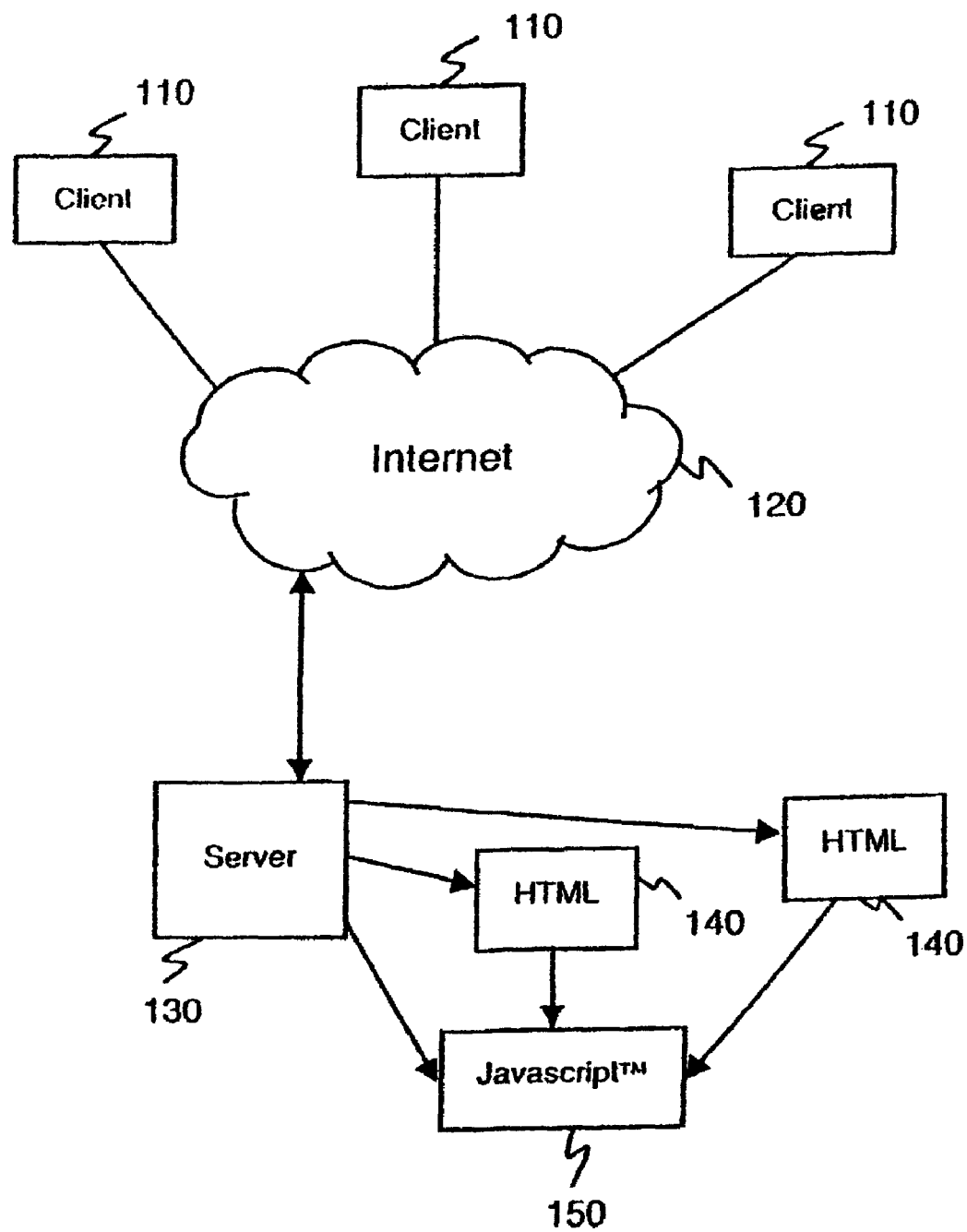
FIG. 1 is a schematic representation of a server connected to the Internet and serving various client terminals, in which the server is able to host information files.

FIG. 1 represents the context in which the HTML and Javascript™ files are used. Client computer systems 110 connect to the Internet 120, to which the server 130 is also connected. The server 130 has stored a source HTML file 140 and a supporting auxiliary Javascript™ file 150. In practice, various HTML files 140 are hosted and can refer to a smaller number (or even a single) Javascript™ file 150.

Figure 2:
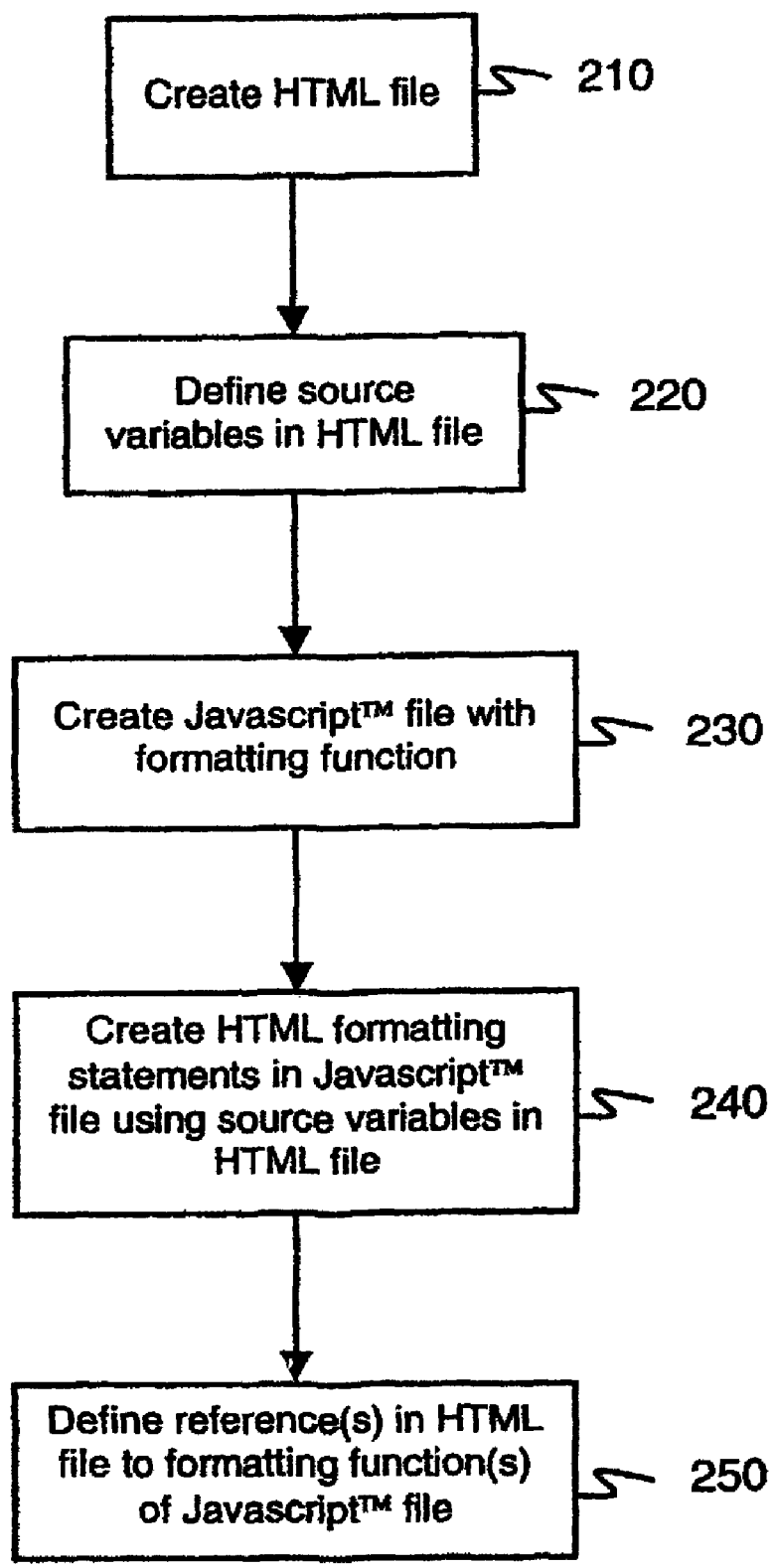
FIG. 2 is a flowchart of the steps which occur in interpreting information files.

FIG. 2 represents the steps involved in providing a HTML file 140 with a supporting Javascript™ file 150. First, the HTML file 140 is created in step 210, containing statements necessary for interpretation as an HTML file. Various source variables are defined within the HTML file 140, relating to the relevant data conveyed by the HTML file 140. A supporting auxiliary Javascript™ file 150 is then created in step 230. In the Javascript™ file 150, step 240 includes a single function in which various Javascript™ statements are defined to generate HTML formatting statements. These statements use source variables defined in the HTML file 140. In step 250, a reference is included in the HTML file 140 where appropriate to the formatting function earlier defined in the Javascript™ file 150.

The result is that when the HTML file 140 is interpreted, by a Web browser, the HTML file 140 calls the formatting function of the Javascript™ file 150 to generate regular HTML statements involving the source variables within the HTML file 140. This outcome and the benefits of this arrangement are illustrated by the following example given in FIGS. 3 to 5.

Figure 3:
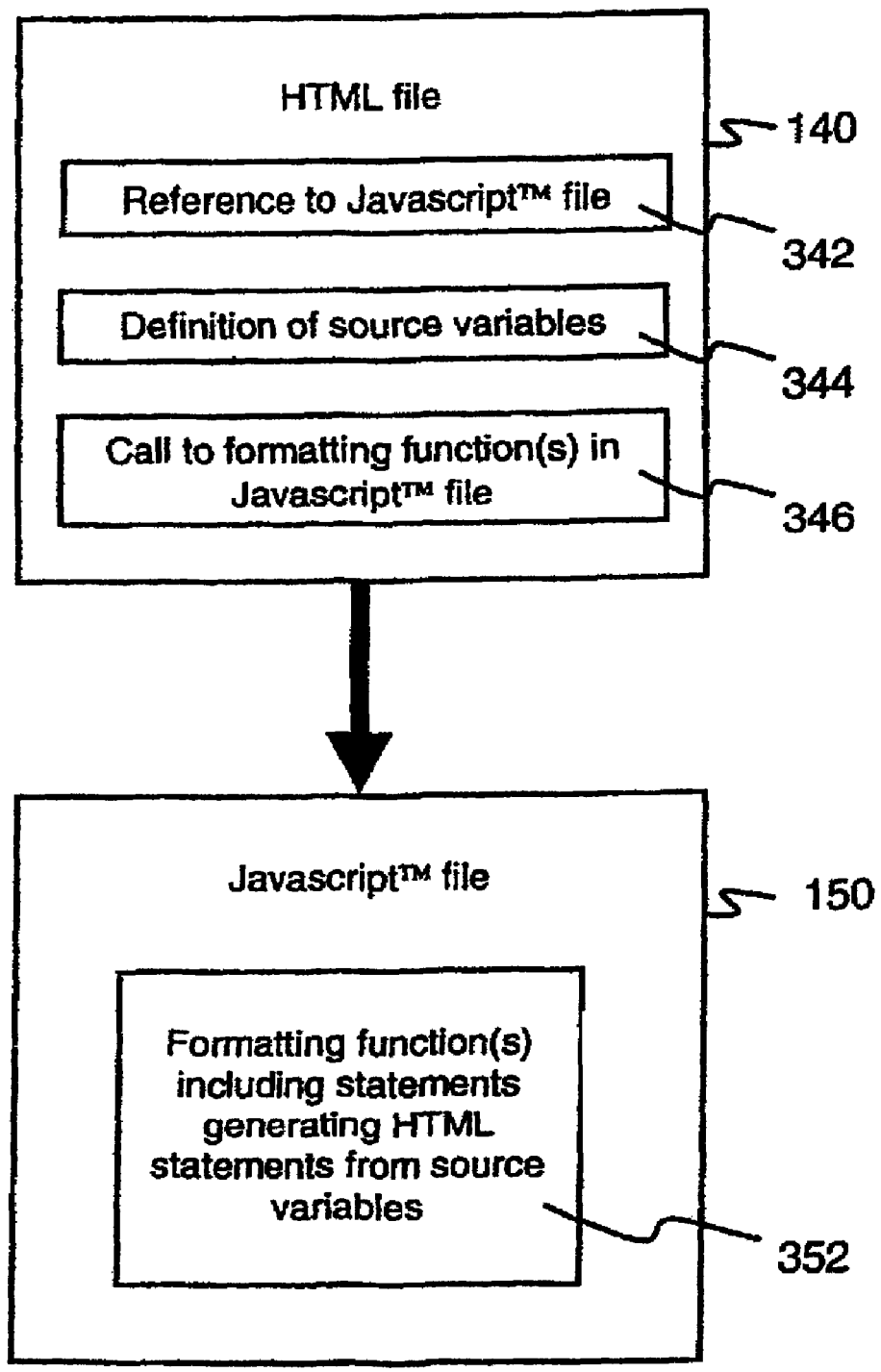
FIG. 3 is a schematic representation of structure and components of the information files referred to in FIG. 2.

FIG. 3 represents in overview the structure and components of the HTML and Javascript™ files 140, 150, as described above. As noted, the HTML file 140 contains:
   a reference 342 to the Javascript™ file 150
   various defined source variables 344
   a function call 346 to the Javascript™ file 150

The Javascript™ file 150 contains a formatting function 352 which uses the defined source variables in the HTML file 140. The reference 342 establishes a link between the two files 140, 150, while the function call 346 triggers execution of the function 352 defined within the Javascript™ file 150.

The above described architecture of the HTML file 140 and Javascript™ file 150, and their interaction with each other, is now described with reference to two particular examples.

For both examples, the HTML file 140 is entitled navjs.html, and the Javascript™ file is entitled idpnav.js. An equivalent file listing is given for both HTML files 140, once expanded with the formatting information supplied by the Javascript™ files 150.

Though each example is described in turn below, the following comments are made in respect of the differences between these two examples.

The first example uses a series of Javascript™ functions in the HTML file 140 of FIG. 4, while the second example uses a single, more complicated, Javascript™ function in the HTML file 140 of FIG. 7. In the first example, a number of relatively small functions in the Javascript™ file 150 of FIG. 4 have defined functions in the task of information formatting. By contrast, in the second example, the single function of the Javascript™ file 150 of FIG. 7 understands the structure of the (in this case, three) arrays which are passed to the Javascript™ file.

The first example is now described directly below with reference to FIGS. 4, 5A and 5B, and 6A and 6B.

FIG. 4 illustrates the contents of the HTML file 140, which contains HTML statements. The HTML statements include source variable definitions, as well as reference to an external file (the Javascript™ file 150) and formatting functions contained within that Javascript™ file 150. The HTML file 140 refers to the Javascript™ file 150, titled idpnav.js, after the first <SCRIPT> tag. This is the auxiliary file. After the second <SCRIPT> tag, a number of source variables 344 are defined as arguments of references 346 to various Javascript™ functions (in this case, _B( ); _L( ); _S( ); _H( ); and _E( )) with which the respective arguments or source variables 344 are associated.

FIGS. 5A and 5B jointly list the contents of the Javascript™ file 150, idpnav.js, as referred to by the HTML file 140 of FIG. 4. This Javascript™ file defines various formatting functions 352, described below, which are referenced by the HTML file 140, as noted above. These functions 352 each defines various specific formatting functions which use the source variables 344 which are included in the HTML file 140 as arguments to these functions.

The functions each define includes various document.writeln or output statements that generate strings which are valid HTML statements for inclusion in the HTML file 140.

An author of the HTML file 140 is familiar with the operation of the various (five) formatting functions 352 included in the HTML file 140. These are:
   _B(tm) for "Begin Menu". The "tm" parameter is the white margin left at the top of the menu.
   _L(i, txt, url) for "Menu Link Item". The "i" parameter is the indent (1, 2 or 3), the "txt" is the text that is displayed in the menu and the "url" is the link information—what URL is linked to if the user "clicks" this menu item.
   _H(i, txt) for "Menu Highlighted Item". The "i" is again the indent and the "txt" is the text that is displayed—and highlighted. This should represent the current page (thus there is no link).
   _S(i) for "Menu Spacer". The "i" is again the indent. This function just leaves a "blank line" in the menu.
   _E( ) for "End of Menu".

The JavaScript™ file 150 has various other functions (which can be identified as they are all in lower case rather than upper case) besides the five main functions 352 referenced by the HTML file 140. The only functions that need concern an author of the HTML file 140 are the formatting functions 352 discussed above that are included in the HTML file 140, and which are in upper case in the Javascript™ file 150.

FIGS. 6A and 6B jointly represent the HTML file 140 of FIG. 4 when the references 346 to the formatting functions 352 is replaced by the equivalent HTML statements generated by the formatting functions 352 of the Javascript™ file 150 for the particular source variables 344 defined in the HTML file 140 as arguments to the formatting functions 352.

The second example is now described directly below with reference to FIGS. 7, 8A and 8B and 9A and 9B, in similar terms as the first example.

FIG. 7 illustrates the contents of the HTML file 140, which contains various HTML statements. The HTML statements include source variable definitions, as well as reference to an external file (the Javascript™ file 150) and the formatting function contained within that file 150. The HTML file refers to the Javascript™ file 150, titled idpnav.js, after the first <SCRIPT> tag. This is the auxiliary file. After the second <SCRIPT> tag, a number of source variables 344 are defined as text strings or text string arrays. Standard HTML statements follow, leading to a reference 346 to the Javascript™ function getnavigator( ) after the third <SCRIPT> tag.

FIGS. 8A and 8B jointly list the contents of the Javascript™ file 150, titled idpnav.js, as referred to by the HTML file 140 of FIG. 4. This Javascript™ file 150 defines a single formatting function 352, titled getNavigator( ), which was referenced by the HTML file 140, as noted above. The getNavigator( ) function 352 defines various internal variables or strings based on the source variables of the HTML file 140, and includes various document.writeln or output statements that generate strings which are valid HTML statements for inclusion in the HTML file 140. These strings are variously formed from possible combinations involving string text, internal string variables and source variables. Such output statements may be provided by repetitive (for loops) or conditional (if statement) inclusion in the HTML file 140.

FIGS. 9A and 9B jointly represent the HTML file 140 of FIG. 4 when the reference to the getNavigator( ) function 352 is replaced by the equivalent HTML statements generated by the getNavigator( ) function 352 of the Javascript™ file 150 for the particular source variables 344 defined in the HTML file 140.

The "expanded" HTML listings in FIGS. 6A and 6B, and FIGS. 9A and 9B are essentially equivalent to each other. For the two examples presented, the HTML file 140 of FIG. 4 and the Javascript™ file 150 of FIGS. 5A and 5B represent HTML statements that are closely similar to HTML statements represented by the corresponding combination of HTML file 140 of FIG. 7 and Javascript™ file 150 of FIGS. 8A and 8B. There are minor differences between FIGS. 6A and 6B and FIGS. 9A and 9B, but these are cosmetic in nature. Accordingly, both examples render in a similar manner in a Javascript™-enabled HTML Web browser application such as Netscape Navigator™.

Figure 10:
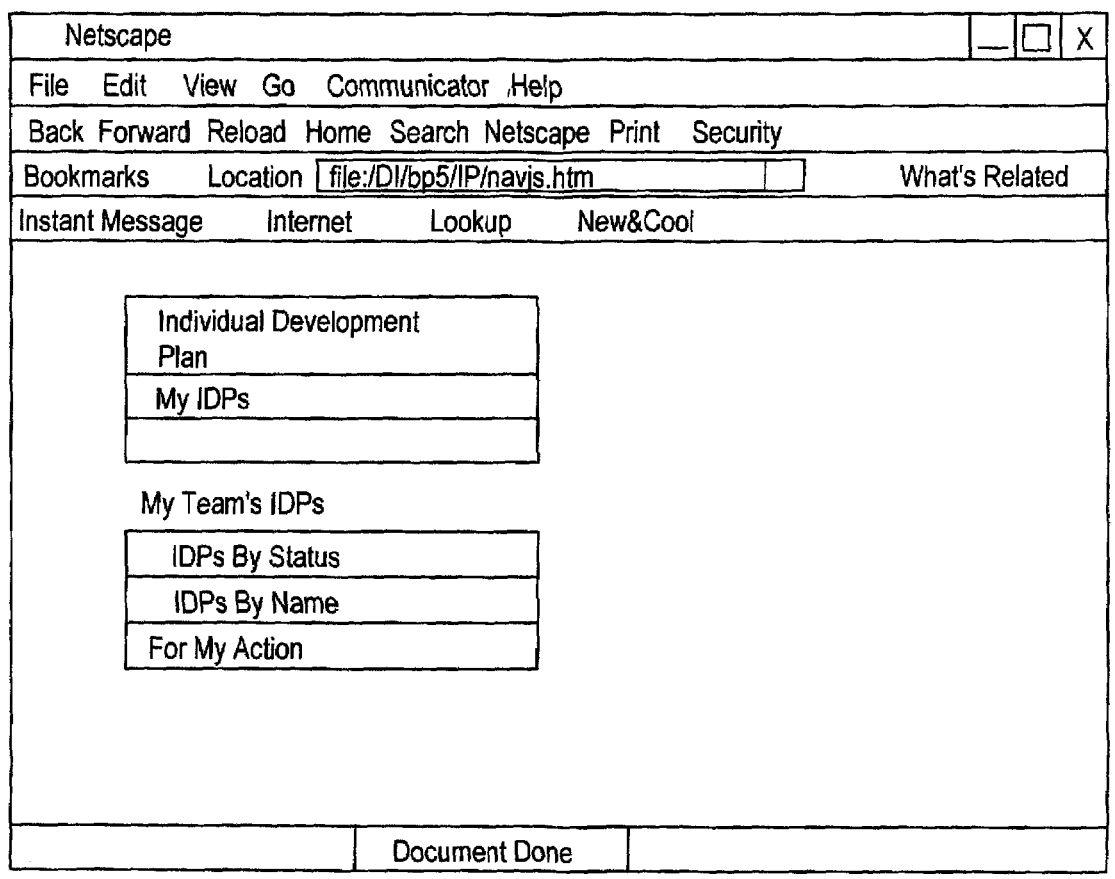
FIG. 10 is a representation rendered by a compatible Web browser, of the first and second example HTML files of FIGS. 4 and 7, in conjunction with the respective Javascript™ files of FIGS. 5A and 5B, and FIGS. 8A and 8B.

FIG. 10 represents the HTML file 140 of FIG. 4/7, when interpreted or rendered by a Web browser (in this case Netscape Navigator™) with reference to the Javascript™ file 150 of FIGS. 5A and 5B/FIGS. 8A and 8B. The Web browser is effectively rendering the equivalent HTML statements of FIGS. 6A and 6B/FIGS. 9A and 9B.

The implementation provided in the first example is generally preferred over that provided in the second example. Interpretation of arrays in the Javascript™ file 150 is avoided, and the menu information appears in the HTML file 140 where it also appears in the rendered document, illustrated in FIG. 10. In the two examples given, the first example occupies approximately 400 bytes less storage capacity compared with the second example.

With reference to the two examples described above, the expanded notional HTML files of FIGS. 6A and 6B, and FIGS. 9A and 9B can be represented more compactly in the form of the HTML file 140 of FIG. 4 or FIG. 7. The HTML file 140 relies on a single supporting Javascript™ file 150 of FIGS. 5A and 5B, or FIGS. 8A and 8B. This Javascript™ file 150 includes the necessary formatting information to generate expanded notional HTML statements with reference to information in the HTML file 140.

By extension from the two examples given above, a family of similar HTML pages can more conveniently maintained and formatted in a standard manner with reference to a single supporting Javascript™ file of the type described. As Web browsers typically cache accessed files for later access, there can be bandwidth savings if the browser does not need to repetitively access similar formatting information for a number of HTML files that is now conveniently included in a single Javascript™ file.

Figure 11:
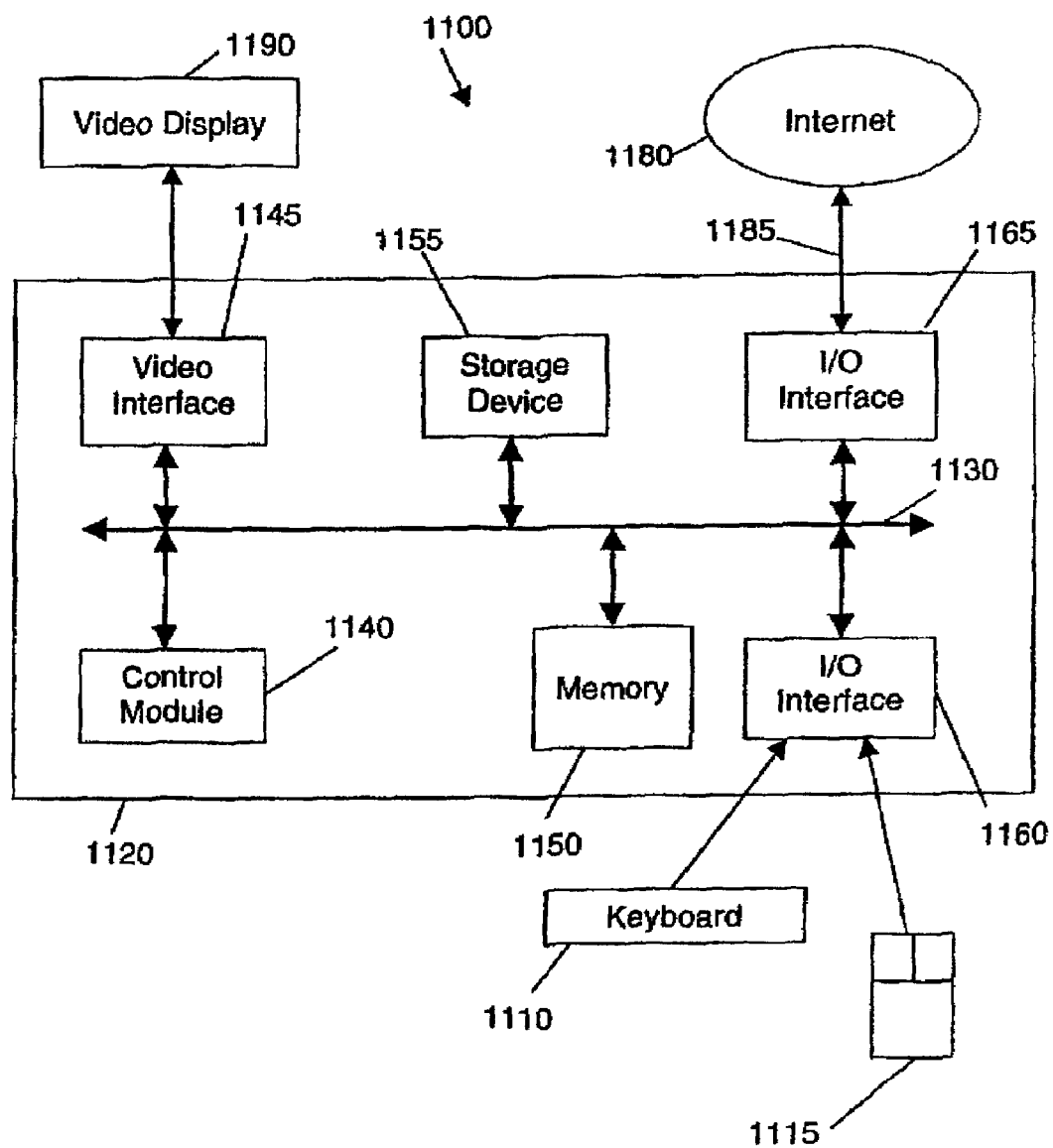
FIG. 11 is a schematic representation of a computing system appropriate for the use of the server or client terminals of FIG. 1, and with which the information files described herein can be generated, stored, and interpreted.

The HTML and Javascript™ files described in the above examples are used in conjunction with servers 130 and client computer terminals 110. These devices 110, 130 are both representative of a general purpose computer system 1100 of FIG. 11, which is generically described below in relation to a computing system 1100. The above described process can be implemented using a computer program product in conjunction with a computer system 1100 as shown in FIG. 11. In particular, the process can be implemented as a computer software program, or some other form of programmed code, executing on the computer system 1100.

As noted, FIG. 11 is a schematic representation of the computer system 1100 which can be used to perform steps in a process which implements the techniques described herein. The computer system 1100 is provided for the purpose of executing computer software which is programmed to assist in performing the described techniques. This computer software executes under a suitable operating system installed on the computer system 1100.

The computer software involves a set of programmed logic instructions that are able to be interpreted by the computer system 1100 for instructing the computer system 1100 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software which has a binary format suitable for execution by the operating system. The computer software is programmed in a manner which involves various software components, or code means, that perform particular steps in the process of the described techniques.

The components of the computer system 1000 include: a computer 1120, input devices 1110, 1115 and video display 1170. The computer 1120 includes: processor 1140, memory module 1150, input/output (I/O) interfaces 1160, 1165, video interface 1145, and storage device 1155.

The processor 1140 is a central processing unit (CPU) that executes the operating system and the computer software executing under the operating system. The memory module 1150 include random access memory (RAM) and read-only memory (ROM), and is used under direction of the processor 1140.

The video interface 1145 is connected to video display 1190 and provides video signals for display on the video display 1170. User input to operate the computer 1130 is provided from input devices 1110, 1115 consisting of keyboard 1110 and mouse 1115. The storage device 1155 can include a disk drive or any other suitable non-volatile storage medium.

Each of the components of the computer 1120 is connected to a bus 1130 that includes data, address, and control buses, to allow these components to communicate with each other via the bus 1130.

The computer system 1100 can be connected to one or more other similar computers via a input/output (I/O) interface 1165 using a communication channel 1185 to a network 1180, represented as the Internet.

The computer software program may be provided as a computer program product, and recorded on a portable storage medium. In this case the computer software program is accessed by the computer system 1100 from the storage device 1162. Alternatively, the computer software can be accessed directly from the network 1180 by the computer 1120. In either case, a user can interact with the computer system 1100 using the keyboard 1110 and mouse 1115 to operate the programmed computer software executing on the computer 1120.

The computer system 1100 is described for illustrative purposes: other configurations or types of computer systems can be equally well used to implement the described techniques. The foregoing is only an example of a particular type of computer system suitable for implementing the described techniques.

It is understood that various alterations and modifications can be made to the techniques and arrangements described herein, as would be apparent to one skilled in the relevant art.

I claim:

1. A computer program product, stored on a computer readable storage device, for creating menus for a number of web pages, the computer program product having instructions for execution by a computer, wherein the instructions, when executed by the computer, cause the computer to implement a method comprising:

receiving, by a computing system, a number of hypertext markup language ("HTML") files for a family of web pages, and storing the HTML files in a memory of the computing system;

receiving a script file by the computing system and storing the script file in the memory, wherein the script file includes script functions for producing menu tables on the web pages to navigate among the web pages, wherein the HTML files have calls to ones of the script functions; and executing, by a browser of the computing system, a first one of the HTML files for one of a plurality of web pages in the family, including executing ones of the script functions for which the first HTML file has calls, wherein the executing includes:

inserting highlighted text in one of said menu tables responsive to the first HTML file calling a menu-highlighted-item one of the script functions, including passing text in an argument of the call for the menu-highlighted-item function to insert with highlighting in the one of the plurality of web pages; and inserting a link in said menu table responsive to the first HTML file calling a menu-link-item one of the script functions, including passing, in arguments of the call, text and a URL for another one of the web pages in the family for the menu-link-item function to insert in the one of the plurality of web pages, so that the browser renders the one of the plurality of web pages having the table for the one of the plurality of web pages, so that the browser presents to a user highlighted text in the table for the one of the plurality of web pages and presents to the user text and a link in the table to another one of the web pages in the family.

2. The computer program product of claim 1, wherein the script file functions include a begin-menu function having an HTML tag in the script file, wherein the HTML tag is for beginning a table and the begin-menu function includes a write-line function in the script file for writing the HTML tag, and wherein the executing of the first HTML file and the ones of the script functions includes writing a line to the one of the plurality of web pages responsive to the first HTML file calling the begin-menu script function, wherein the line includes the HTML tag for beginning the menu table.

3. The computer program product of claim 2, wherein in the HTML file for the one of the plurality of web pages, the call to the begin-menu function includes an argument for a width attribute of a table-data tag in the script file.

4. The computer program product of claim 1, wherein the script file functions include a menu-spacer function and wherein the executing of the first HTML file and the ones of the script functions includes inserting space in the menu table responsive to the first HTML file calling the menu-spacer function.

5. The computer program product of claim 4, wherein in the first HTML file, the call to the menu-spacer function includes an argument for a function included in the menu-spacer function of the script file.

6. The computer program product of claim 2, wherein the script file functions include an end-of-menu function having a tag in an argument thereof in the script file, the tag being for ending a table, and wherein the executing of the first HTML file and the ones of the script functions includes writing a line to the one of the plurality of web pages responsive to the first HTML file calling the end-of-menu script function, wherein the line includes the HTML tag for ending the menu table.

7. A computer program product including a computer readable storage device having stored thereon a family of web pages with menu tables for navigating among the pages, the computer readable storage device including:

a number of hypertext markup language ("HTML") files for executing by a browser of a computing system to render a family of web pages; and a script file to the computing system for executing by the browser, wherein the script file includes script functions for producing menu tables on the web pages to enable navigation among the web pages, wherein one of the script file functions includes a menu-highlighted-item function for inserting highlighted text in said menu table, and one of the functions includes a menu-link-item function for inserting a link in said menu table, wherein the HTML file for one of a plurality of web pages in the family includes a call to the menu-link-item function, the call including text in an argument of the call for the menu-highlighted-item function to insert with highlighting in one of the plurality of web pages, and the HTML file for the one of the plurality of web pages includes a call to the menu-link-item function, wherein arguments for the menu-link-item function include text and a URL for another one of the web pages in the family for the menu-link-item function to insert in the one of the plurality of web pages, so responsive to the one of the plurality of web pages being executed by the browser, the browser presents to a user the table for the one of the plurality of web pages, wherein the presented table includes highlighted text for the one of the plurality of web pages and includes text and a link to another one of the web pages in the family.

8. The computer program product of claim 7, wherein the script file functions include a begin-menu function having an HTML tag in the script file for beginning a table, and wherein the begin-menu function includes a write-line function in the script file to write a line to a web page responsive to an HTML file calling the begin-menu function, wherein the line includes the HTML tag for beginning the table, and wherein the HTML file for the one of the plurality of web pages includes a call to the begin-menu function to format the menu table.

9. The computer program product of claim 8, wherein in the HTML file for the one of the plurality of web pages, the call to the begin-menu function includes an argument for a width attribute of a table-data tag in the script file.

10. The computer program product of 7, wherein the script file functions include a menu-spacer function for inserting space in said menu table.

11. The computer program product of 10, wherein in the HTML file for the one of the plurality of web pages, the call to the menu-spacer function includes an argument for a function included in the menu-spacer function of the script file.

12. The computer program product of 8, wherein the script file functions include an end-of-menu function having a tag in an argument thereof in the script file, wherein the tag is for ending said menu table.

13. A computer system comprising:
a processor; and
a storage device connected to the processor, wherein the storage device has stored thereon menu creation program for controlling the processor, and wherein the processor is operative to execute instructions of the program to implement a method comprising:

receiving, by a computing system, a number of hypertext markup language ("HTML") files for a family of web pages, and storing the HTML files in a memory of the computing system;

receiving a script file by the computing system and storing the script file in the memory, wherein the script file includes script functions for producing menu tables on the web pages to navigate among the web pages, wherein the HTML files have calls to ones of the script functions; and executing, by a browser of the computing system, a first one of the HTML files for one of a plurality of web pages in the family, including executing ones of the script functions for which the first HTML file has calls, wherein the executing includes:

inserting highlighted text in one of said menu tables responsive to the first HTML file calling a menu-highlighted-item one of the script functions, including passing text in an argument of the call for the menu-highlighted-item function to insert with highlighting in the one of the plurality of web pages; and inserting a link in said menu table responsive to the first HTML file calling a menu-link-item one of the script functions, including passing, in arguments of the call, text and a URL for another one of the web pages in the family for the menu-link-item function to insert in the one of the plurality of web pages, so that the browser renders the one of the plurality of web pages having the table for the one of the plurality of web pages, so that the browser presents to a user highlighted text in the table for the one of the plurality of web pages and presents to the user text and a link in the table to another one of the web pages in the family.

14. The computer system of claim 13, wherein the script file functions include a begin-menu function having an HTML tag in the script file, wherein the HTML tag is for beginning a table and the begin-menu function includes a write-line function in the script file for writing the HTML tag, and wherein the executing of the first HTML file and the ones of the script functions includes writing a line to the one of the plurality of web pages responsive to the first HTML file calling the begin-menu script function, wherein the line includes the HTML tag for beginning the menu table.

15. The computer system of claim 14, wherein in the HTML file for the one of the plurality of web pages, the call to the begin-menu function includes an argument for a width attribute of a table-data tag in the script file.

16. The computer system of claim 13, wherein the script file functions include a menu-spacer function and wherein the executing of the first HTML file and the ones of the script functions includes inserting space in the menu table responsive to the first HTML file calling the menu-spacer function.

17. The computer system of claim 16, wherein in the first HTML file, the call to the menu-spacer function includes an argument for a function included in the menu-spacer function of the script file.

18. The computer system of claim 14, wherein the script file functions include an end-of-menu function having a tag in an argument thereof in the script file, the tag being for ending a table, and wherein the executing of the first HTML file and the ones of the script functions includes writing a line to the one of the plurality of web pages responsive to the first HTML file calling the end-of-menu script function, wherein the line includes the HTML tag for ending the menu table.

19. A computer system comprising:
a processor; and
a storage device connected to the processor, wherein the storage device has stored thereon a web page family hosting program for controlling the processor, and wherein the processor is operative to execute instructions of the program to implement a method comprising:

storing a number of hypertext markup language ("HTML") files for a family of web pages in a host computing system memory for rendering by a browser of a client computing system; and storing a script file in the memory for executing by the browser, wherein the script file includes script functions for producing menu tables on the web pages to navigate among the web pages, wherein one of the script file functions includes a menu-highlighted-item function for inserting highlighted text in said menu table, and one of the functions includes a menu-link-item function for inserting a link in said menu table, wherein the HTML file for one of a plurality of web pages in the family includes a call to the menu-link-item function, the call including text in an argument of the call for the menu-highlighted-item function to insert with highlighting in the one of the plurality of web pages, and the HTML file for the one of the plurality of web pages includes a call to the menu-link-item function, wherein arguments for the menu-link-item function include text and a URL for another one of the web pages in the family for the menu-link-item function to insert in the one of the plurality of web pages, so that responsive to the first HTML file being rendered by the browser, the browser presents to a user the table for the one of the plurality of web pages, wherein the presented table includes highlighted text for the one of the plurality of web pages and includes text and a link to another one of the web pages in the family.

20. The computer system of claim 19, wherein the script file functions include a begin-menu function having an HTML tag in the script file for beginning a table, and wherein the begin-menu function includes a write-line function in the script file to write a line to a web page, wherein the line includes the HTML tag for beginning the table, and wherein the HTML file for the one of the plurality of web pages includes a call to the begin-menu function to format the menu table, so that responsive to the first HTML file being rendered by the browser a line is written to the one of the plurality of web pages, wherein the line includes the HTML tag for beginning the menu table.

21. The computer system of claim 20, wherein in the HTML file for the one of the plurality of web pages, the call to the begin-menu function includes an argument for a width attribute of a table-data tag in the script file.

22. The computer system of claim 19, wherein the script file functions include a menu-spacer function for inserting space in said menu table.

23. The computer system of claim 22, wherein in the HTML file for the one of the plurality of web pages, the call to the menu-spacer function includes an argument for a function included in the menu-spacer function of the script file.

24. The computer system of claim 20, wherein the script file functions include an end-of-menu function having a tag in an argument thereof in the script file, wherein the tag is for ending said menu table.

\* \* \* \* \*